United States Patent Office 3,162,431
Patented Dec. 22, 1964

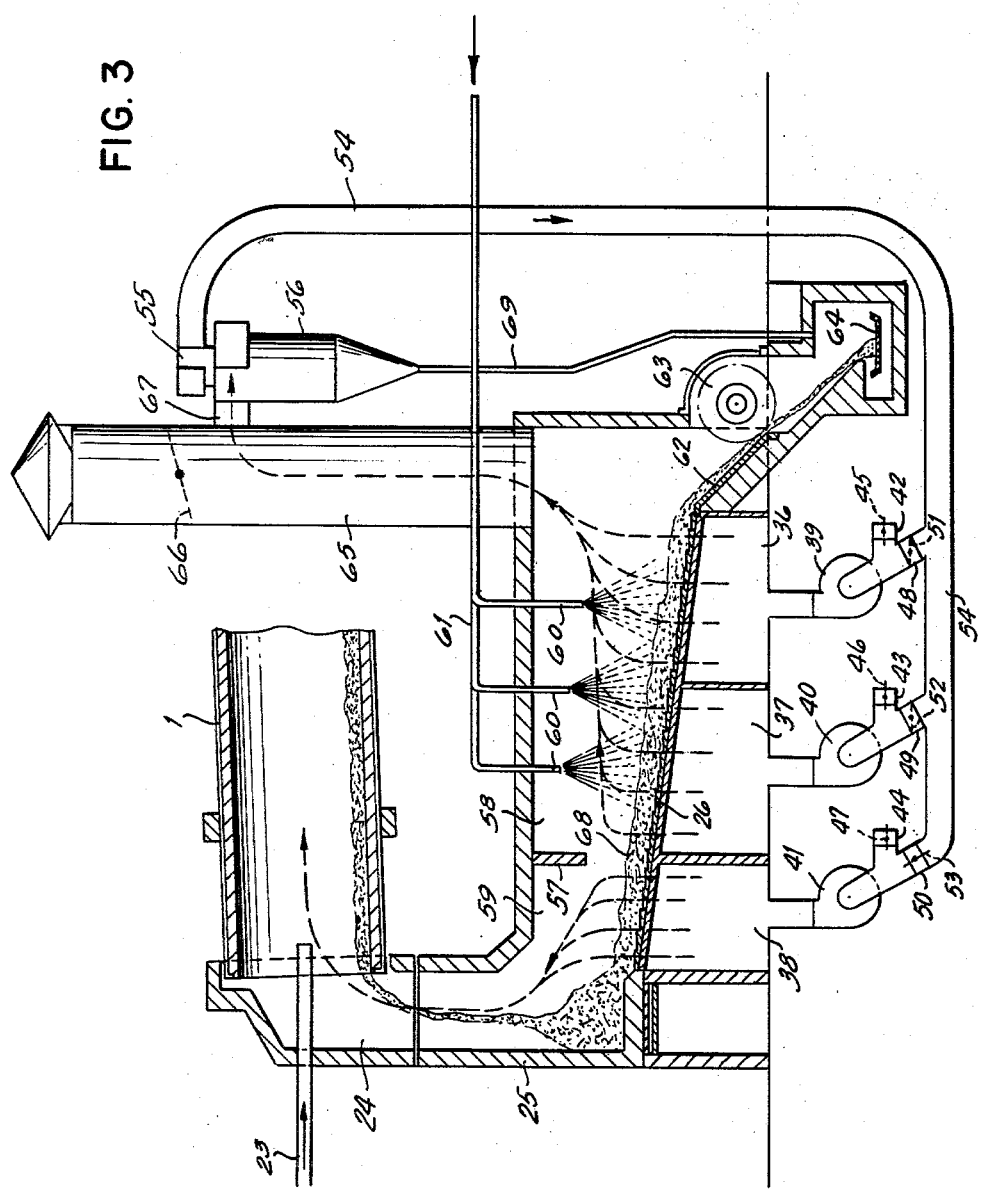

3,162,431
METHOD AND MEANS FOR IMPROVING ELECTRIC PRECIPITATION OF DUST FROM KILN WASTE GASES
Franz Müller, Bensberg-Refrath, Herbert Deussner, Cologne-Dellbruck, and Kunibert Brachthäuser, Cologne-Poll, Germany, assignors to Klöckner-Humboldt-Deutz Aktiengesellschaft, Cologne-Deutz, Germany, a corporation of Germany
Filed Apr. 5, 1962, Ser. No. 185,373
Claims priority, application Germany Apr. 7, 1961
11 Claims. (Cl. 263—32)

Our invention relates to the elimination of fly dust by electric precipitation from kiln waste gases, particularly those coming from rotary cement kilns operating on the dry calcining principle.

It is known to pass the waste gases from a rotary cement kiln through heat exchanging devices for pre-heating the cement raw material entering into the kiln, and to remove any residual dust from the waste gases by electrostatic precipitation before the cleaned gases are permitted to escape into the atmosphere. Such dust removal in an electric field often encounters difficulties due to the fact that the moisture content of the waste gases is too slight, i.e. the dew point of the gases is rather low. It is known that the removal of dust from gases in an electric field can be performed more readily the higher the dew point of the dust-laden gases, it being of course necessary to keep the gas temperature above the dew point.

It has been proposed, therefore, to raise the dew point of cement-kiln waste gases by injecting water into a heat exchanger interposed between the flue end of the kiln and the electric dust filter for pre-heating the cement raw material. This, however, is a difficult matter because the evaporation of the water and its uniform distribution in the gas require a certain minimum amount of time not compatible with the necessity for maintaining a high speed of gas flow from the kiln to the electric filter in order to avoid dust accumulations. Consequently an attempt to inject water into the pre-heater portion of the plant requires excessively long conduit lines between the rotary kiln and the electro-filter. When injecting water into a vortex chamber or similarly operating portion of pre-heater equipment, the length of the conduits can be kept shorter, but this entails the danger of incrustations being deposited on the chamber walls due to mixing of the injected water with the dust entrained by the waste gases.

It is in an object of our invention to devise a method and means for electric removal of dust from kiln waste gases, particularly those issuing from cement rotary kilns operating on the dry principle, that eliminate the above-mentioned difficulties. That is, our invention aims at affording an improved and more reliable electric dust removal from the waste gases without requiring excessively long gas conduits between the kiln and the electric precipitator and without the danger of increasing the tendency of depositions to occur on the walls of the pre-heater equipment.

To this end, and in accordance with our invention, we take adavntage of conditions obtaining by virtue of the fact that kilns of the type here involved, particularly rotary cement kilns, are usually provided with a cooler at the material-outlet end of the kiln, the cooling being effected by passing air through the material as it travels through the cooler. This is the case particularly with the conventional air-traversed cement coolers that have a grating on which a travelling bed of the processed material, particularly cement clinker, travels form the kiln to the exit of the cooler, the air being blown through the grafting and entirely or partially supplied to the kiln for combustion purposes.

Now, according to a feature of our invention, we introduce water into the cooler for increasing the dew point of the kiln waste gases by having at least a portion of the heated and moisture-laden air pass from the cooler through the kiln. Since little dust occurs in the cooler, virtually no adhering deposits or disturbing incrustations are formed, and a complete evaporation and uniform distribution of the water is secured because the travel path to the electric dust precipitator is very long.

It is particularly advantageous to spray the water directly onto the hot bed or layer of material in the cooler. It is not necessary in this case to provide for fine jets of water but suffices to supply the water for example by sprinkling.

According to another feature of our invention it is preferable to introduce the water into the first portion of the cooler, seen in the transporting direction of the material issuing from the kiln. At this location the cooler as well as the cooling gases have a particularly high temperature so that the water evaporates rapidly.

If only a portion of the heated air is passed into the kiln, then according to a further feature of our invention, the heating energy required for evaporation can be compensated by supplying the cooler with a smaller amount of cooling air so that the quantity of air entering into the kiln maintains substantially the same temperature as without the added water.

According to another, advantageous embodiment of our invention, the method is performed by passing the fresh cooling air through the material located in the last portion of the cooler seen in the travelling direction of the material, introducing water into this same portion of the cooling device above the material, and then passing the entire or almost entire quantity of air thus moistened through the material located in the first portion of the cooling device and thereafter through the rotary kiln, before the waste gases which, as the case may be, may then pass through a pre-heater device, are liberated from fly dust by electric precipitation.

The quantity of water to be introduced into the cooler is determined by the desired dew point. It is to be taken into account that appreciable quantities of water are already brought into the kiln by the humidity of the air of combustion, the surface moisture of the fuel used for firing the kiln, and by the water resulting from the combustion, as well as by any humidity of the raw material. The dew point required for good dust precipitation depends upon the properties of the dust contained in the waste gases. In general, relating to the waste gases of cement rotary kilns, a dew point of about 40° C. affords good electric dust precipitation even if the cleaned gas is to attain a dust content of about 0.1 g. per cubic meter operating gas, as is often required.

The invention will be further described with reference to embodiments of cement manufacturing plants schematically illustrated by way of example on the accompanying drawings, these plants being provided with a rotary kiln, a heat exchanger for pre-heating the raw material, an electric filter and a clinker cooler of the inclined-grate type.

FIG. 3 is a longitudinal section through the cooler according to FIG. 2 on enlarged scale.

Figure 1:
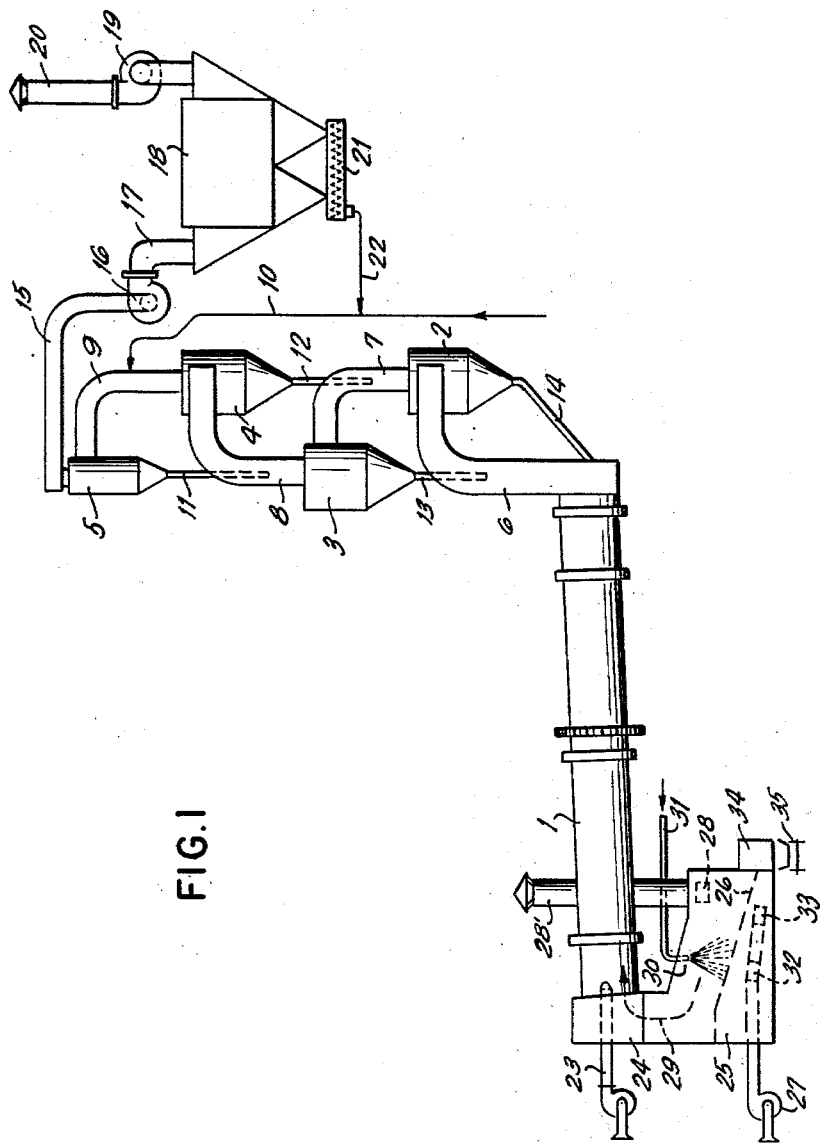
FIGS. 1 and 2 show respectively different embodiments of complete plants.

According to FIG. 1, a rotary cement kiln 1 is connected with a heat-exchanger for pre-heating the cement raw material. The pre-heater comprises four serially arranged cyclones 2 to 5. The waste gases of the kiln pass successively through a conduit 6 to cyclone 2, through a conduit 7 to cyclone 3, through a conduit 8 to cyclone 4 and through a conduit 9 to cyclone 5. The cement raw material is supplied by a pneumatic conveyor 10 or any other suitable conveyor, for example a bucket conveyor, into the conduit 9 leading to the cyclone 5. In conduit 9 the material is entrained by the waste gases passing into the cyclone 5. The raw material precipitated in cyclone 5 after having been in intimate heat exchanging contact with the gas, passes through a dust discharge pipe 11 into the gas conduit 8 where it is entrained to the cyclone 4. In the same manner the raw material travels through the cyclones 3 and 2 and is issued from the latter through a dust discharge pipe 14 into the kiln 1. On its path through the pre-heater the cement raw material thus enters into heat-exchanging contact with gas quantities of respective increasing temperatures thus effecting a good heat exchange with these gases, issuing from the kiln at a temperature of about 1000 to 1200° C. During heat exchange the temperature of the gases decreases down to about 300 to 350° C. behind cyclone 5, and the temperature of the raw material simultaneously increases to about 800° C. at the lower end of its travel.

The waste gases leave the pre-heater through a gas conduit 15. They are impelled by a blower 16 and subsequently pass through a conduit 17 into an electric filter 18. Filters suitable for this purpose are known as such. Reference may be had, for example, to U.S. Patent 2,925,144 of Kroll assigned to the assignee of the present invention. The outlet conduit of the electric filter 18 is connected with another blower 19 which forces the cleaned gases through a chimney 20 into the open air. The dust precipitated in the electric filter 18 is collected in a screw-type conveyor 21 and is passed to the conveyor 10 by suitable means schematically denoted by 22, consisting for example of glideways or air-conveyor troughs. Thus the precipitated dust is returned to the heat exchanger together with the fresh raw material.

As mentioned, the pre-heated raw material enters through pipe 14 into the kiln 1. It then travels through the kiln in the downward direction while being burned to clinkers by the counter flow of heating gases under the effect of the flames coming from the burners 23 of the plant. The clinkers are discharged at the head portion 24 of the kiln and then enter a clinker cooler 25 which, in the illustrated embodiment, is designed as an inclined-grate cooler with a stepped grating 26. Cold air is forced from the outside into the cooler below the grate 26 by means of a blower 27. The air passes through the grate and then cools the clinker travelling over the grate. As shown in FIG. 1, the cooling air is blown into the cooler through two openings 32 and 33. If desired, more such openings may be provided.

A portion of the heated air, namely the air flowing through the lower portion of the grate and heated to a lesser extent, passes through an opening 28 into a chimney 28' to escape into the ambient air. The other, more highly heated portion of the air passes through the kiln head 24 into the kiln as indicated by a broken-line arrow 29. This heated air serves as secondary air of combustion.

Above the grate 26 and within the flow range of the cooling air that passes into the kiln for combustion purposes, a number of sprinklers 30 are distributed over the entire width of the cooler and are connected to a water line 31. The sprinklers serve to eject water onto the clinker bed travelling downward on grate 26. Due to the high clinker temperature, the water evaporates rapidly and thus enters into the heated flow of air which entrains the water into the kiln 1. For a given quantity of cooling air, the air temperature is reduced by evaporation of the water supplied to the cooler. For avoiding such drop in temperature, the cooler can be operated without detriment with a smaller air quantity so that the temperature of the air passing into the kiln is kept substantially at the usual value. Since this requires reducing the total quantity of air, the amount of air withdrawn through the chimney 28', relative to the total air quantity, is preferably also reduced so that the same air quantity as without water supply at the same temperature can be passed to the furnace. Then the reduction in air quantity required for maintaining the air temperature when supplying water, has substantially only the effect of reducing the air quantity passing through the chimney 28'. In this manner the heat balance of kiln operation is not appreciably changed by supplying the cooler with water.

After leaving the cooler, the clinker is preferably crushed in a breaker 34 mounted on the cooler, and is subsequently carried away on a conveyor belt 35 or the like.

Figure 2:
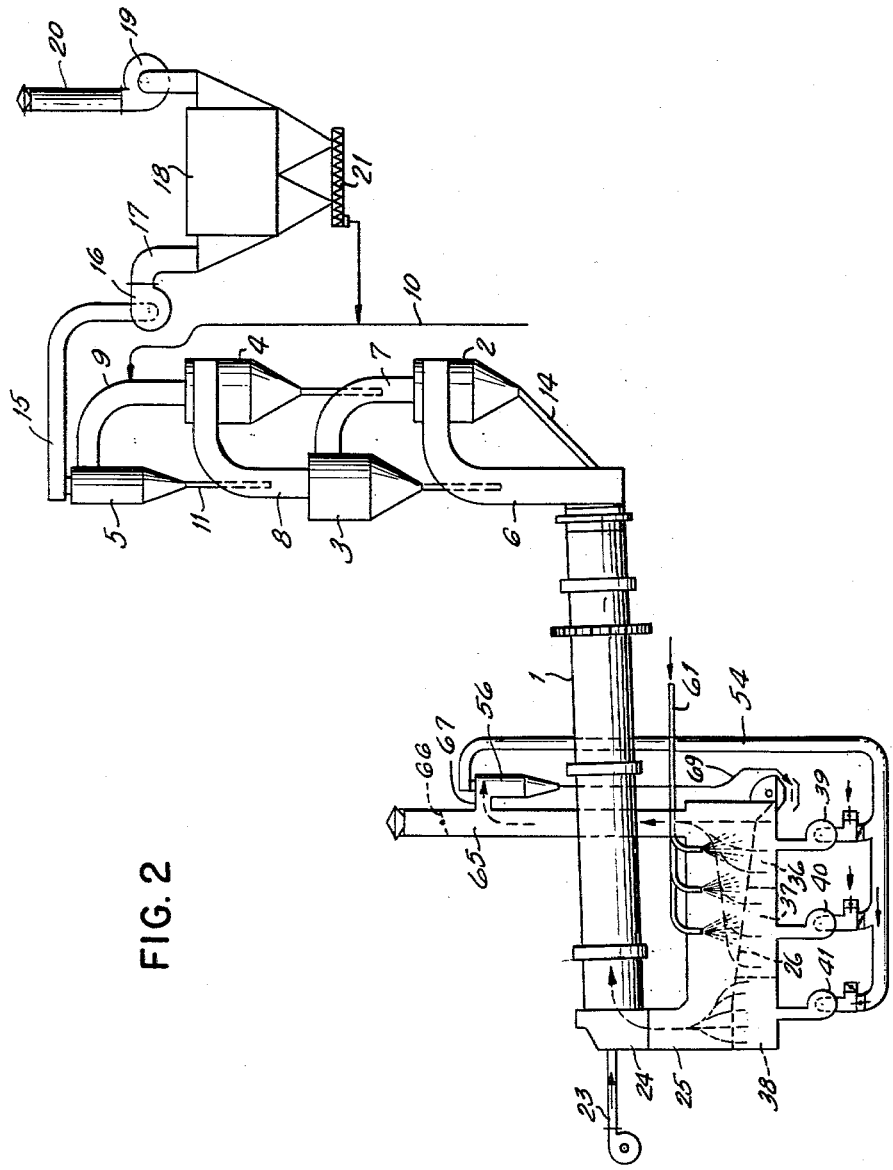

The cement plant illustrated in FIG. 2 is to some extent similar to that of FIG. 1, the same reference characters being applied to corresponding elements respectively. According to FIG. 2, three plenum chambers for supply of air are provided beneath the inclined-grate cooler. The raw material pre-heated in the heat exchanger passes in the above-described manner through the dust-carrying pipe 14 into the kiln 1. It travels downwardly through the kiln while being burned to clinkers by the counter-flow of heating gases and the flames coming from the burners 23. From the kiln head 24 the clinkers reach the cooler device 25 designed as a grate-cooler with a downwardly inclined stepped grating 26. The three chambers 36, 37 and 38 beneath the grating 26 are connected with the pressure side of respective blowers 39, 40 and 41. The suction of each side blower is provided with an inlet duct 42, 43 or 44 for inducting air from the atmosphere. Each inlet duct contains a throttle flap 45, 46, 47 for controlling the inducted air quantity. Beneath each suction duct 42, 43, 44 the suction side of each blower is connected with a common conduit 54 through a connector 48, 49, 50 (FIG. 3) containing a damper flap 51, 52 or 53. The common line 54 is connected to the clean-gas outlet 55 of a cyclone 56.

It is preferable to subdivide the space above the grate 26 by a partition 52 into two compartments 58 and 59. Mounted in compartment 58 are several sprinklers 60 which are distributed over the entire width of the stepped grate 26 and are connected with a water line 61. Adjacent to the right end of the grate 26 is a slide 62 above which a clinker breaker 63 is preferably provided. The breaker serves to comminute the coarser clinkers gliding downward on the slide 62. The clinkers then pass on a conveyor 64 and travel to the locality of further fabrication. The right end of the compartment 58 communicates at the top with a chimney 65 in which a damper 66 is mounted. A branch conduit 67 joins the chimney 65 beneath the damper 66 and enters tangentially into the cyclone 56.

During operation the flaps 45, 46 and 53 are open, and the flaps 47, 51 and 52 are closed. The blowers 30 and 31 induct air from the atmosphere into chambers 36 and 37. The air passes through the gaps of the stepped grate 26 and through the bed of clinkers 68. In this manner the clinkers are effectively cooled and the air is heated. Simultaneously the sprinklers 60 are operated to introduce water in compartment 58 upon the portion of the clinker bed located in this compartment. Due to the high temperature in compartment 58 the water is rapidly evaporated, thus also reducing the temperature of the heated air. The steam mixes with the air and the mixture passes into the chimney 65. During operation the damper flap 66 in chimney 65 is so adjusted that the steam-laden air passes entirely, or to a major portion, through conduit 67 into cyclone 56. In this cyclone the clinker dust constituents contained in the steam-air mixture are precipitated and pass through a dust-discharge pipe 69 to the conveyor 64.

The steam-laden air thus cleaned passes from cyclone 56 through conduit 54 and is forced by blower 41 into the chamber 38. From this chamber the steam-laden air is impelled by the blower 16 (FIG. 2) and passes through the first portion of the grate 26 and through the clinker layer located on this portion. As a result, the steam-air mixture is heated to a relatively high temperature, for example 700 to 800° C., while simultaneously cooling the fresh and hence hottest clinkers to about the same temperature. This hot steam-air mixture then passes from compartment 59 to the kiln head 24 and into the kiln 1 to serve as secondary air of combustion. In this manner the kiln gases become enriched with steam to the extent required for the desired good precipitating operation in the electric filter 18.

As mentioned, it has been found advisable to make the water quantity introduced into the cooler so large that the dew point of the kiln waste gases is approximately 40° C. This temperature however should serve essentially as a guidance only. In some cases the dew point of the waste gases must be adjusted to a higher value to obtain satisfactory electric precipitation of fly dust from the gases. In other cases, however, a lower dew point already secures good dust removal. This depends above all upon the properties of the dust to be precipitated in the electric field, aside from the gas temperature and other factors.

As mentioned, the introduction of water into compartment 58 and onto the clinker bed contained therein, causes rapid evaporation of the water. For that reason the water need not be given a fine distribution such as by an atomizer. It is rather sufficient to issue it from simple sprinklers. Since further the evaporation is effected by the heat quantity normally lost through the chimney 65 of the cooling device, no additional heat losses are involved. On the other hand, since the steam entering into the furnace together with the secondary air has a temperature of about 700 to 800° C. as mentioned above, its heat content is utilized to a great extent in the heat-exchanger for pre-heating the cement raw material. Of course, the gas temperature must not drop down to the dew point until after it issues from the filter 18 or the chimney 20. The heat losses which possibly may thus be involved, however, are at least compensated by the savings in heating energy used for evaporation and by utilization of the steam for pre-heating the cement raw material. Consequently the over-all heat balance of the plant is not impaired by the evaporation of the added water. The invention thus affords enriching the kiln waste gases with moisture, without heat losses and without the need for complicated equipment, such as jet-type nozzles, to obtain a sufficient steam content in the waste gases and reliably obtain a high separation degree in the electric filter.

A further advantage of the invention is the fact that the quantity of cooling air to be supplied to the last portion of the cooler, i.e. through the chambers 37 and 36, can be kept smaller than without additional water because some of the clinker heat is consumed for evaporation of the water. The air quantity required for cooling can therefore be reduced so considerably that it corresponds to the necessary secondary-air quantity of the rotary kiln. For that reason the blowers 39 and 40 need induct only a correspondingly small quantity of cooling air, thus also economizing electrical power for operating these blowers. Furthermore, this mode of operation permits closing the damper flaps 66 in chimney 65 entirely so that no cooler air and clinker dust is discharged through this chimney into the ambient atmosphere.

In addition to the air inducted through the ducts 42 and 43 from the atmosphere, the chambers 36 and 37 can also be supplied with warm circulating air from the conduit 54 by opening the damper flaps 51 and 52. The heat quantity of such circulating air aids in evaporating the water sprayed into the chamber 58. The introduction of circulating air into chambers 36, 37 also increases the speed of the air passing through the gaps of the grate 26 thus reducing the amount of material that may drop through the grate. However, by opening the damper flap 47 the chamber 38 can be supplied not only with circulating air from the conduit 54 but also with fresh air from the atmosphere.

It is not always necessary to provide each of chambers 36 and 37 with its own blower 39 or 40. Both chambers may also be connected to a common blower which is then given correspondingly large dimensions. It is further possible to provide only one air chamber instead of the two chambers 36, 37.

The invention is not only applicable with kilns having a grate-type cooler but is also of advantage in conjunction with cooling devices of other suitable types. The pre-heater device connected with the flue end of the kiln need not be designed as a cyclone system as shown in the illustrated embodiments. The invention is rather independent of the particular type of pre-heater with which the rotary kiln is equipped, and the invention is also advantageously applicable in plants not provided with a pre-heater.

The invention is further applicable for the electric dust removal from waste gases coming from kilns for other purposes provided these kilns are equipped with air-traversed coolers and the air passing through the coolers is conducted entirely or in part through the kilns. It will be understood that the method of the invention is not limited to the use of air in the coolers but is analogously applicable when using other gaseous coolants, for example inert gases.

Upon a study of this disclosure, such and other modifications and uses of the invention will be obvious to those skilled in the art and are indicative of the fact that the invention can be given embodiments other than particularly illustrated and described herein, without departing from the essential features of our invention and within the scope of the claims annexed hereto.

We claim:

1. The method of improving electric precipitation of dust from waste gases of a rotary cement kiln having an air-traversed cooler grating for clinker issuing from the kiln, which comprises passing fresh cooling air from below through the clinker material located on the last portion of the cooler grating relative to the travel direction of the material, spraying water onto said last portion of the cooler grating above the material thereon, passing at least a major portion of the resulting moistened and heated air through the material located in the preceding portion of the cooler and thence to the kiln, whereby the introduced water raises the dew point of the waste gases to increase electric dust precipitation.

2. The method according to claim 1, wherein the quantity of fresh air supplied to said last portion of the cooler corresponds substantially to the quantity of secondary combustion air required for the kiln.

3. The method according to claim 1, which comprises the step of circulating a portion of said moistened and heated air back to said last portion of the cooler in addition to supplying said fresh air to said last portion.

4. The method of improving electric precipitation of dust from waste gases of a kiln having an air-traversed cooler for material issuing from the kiln, which comprises introducing water into the moving air in the cooler and passing at least a portion of the resulting steam-laden and heated air into the kiln, and adjusting the quantity of the introduced water to a value at which the dew point of the kiln waste gases is about 40° C., whereby the amount of subsequent electric precipitation of dust is increased.

5. A kiln having a material inlet end and a material outlet end, an electric dust precipitation device and waste-gas conduit means connecting said device with said material inlet end, and a material cooler connected to said material outlet end and having coolant air supply means for cooling the material issuing from the kiln, a grating within said cooler arranged to be traversed by air from said supply means and to receive layers of said material from said kiln, water supply means comprising sprinklers mounted in said cooler over said grating for spraying water onto the material located on a first portion of said grating nearest the material entrance side of said grating, means for exhausting directly to the ambient atmosphere that portion of the air which traverses a second portion of said grating furthest from the material entrance side of said grating, and means for introducing into the kiln the resident steam-laden and heated air which passes through said grating, whereby the dew point of the kiln waste gases is raised for improved dust precipitation in said device.

6. A rotary cement kiln having a material inlet end and a material outlet end, an electric dust precipitation device and waste-gas conduit means connecting said device with said material inlet end, and a clinker cooler connected to said material outlet end and having a grate for receiving clinker material from said kiln, air supply means connected with said cooler beneath said grate for passing cooling air through the clinker material on said grate into said kiln, water supply means comprising spray members mounted in the portion of said cooler above said grate for spraying water upon said clinker material located nearest the material receiving end of said grate, means for exhausting directly to the ambient atmosphere that portion of the air which traverses the clinker material located furthest from the material receiving end of said grate, and means for introducing into the kiln the residual steam-laden and heated air which passes through said grate, whereby the dew point of the kiln waste gases is raised for improved dust precipitation in said device.

7. A rotary cement kiln having a material inlet end and a material outlet end, a pre-heater having gas conduit means connected to said inlet end to receive waste gases from said kiln and having material supply means joined with said conduit means for heat exchange and connected to said inlet end to pass pre-heated material into said kiln, an electric dust precipitator connected to said gas conduit means for eliminating dust from said waste gases, and a clinker cooler connected to said material outlet end and having air supply means for cooling the material issuing from the kiln, a grating within said cooler arranged to be traversed by air from said supply means and to receive layers of said material from said kiln with water supply means comprising sprinklers mounted in said cooler over said grating for spraying water onto the material located on a first portion of said grating nearest the material entrance side of said grating, means for exhausting directly to the ambient atmosphere that portion of the air which traverses a second portion of said grating furthest from the material entrance side of said grating, and means for introducing into the kiln the resident steam-laden and heated air which passes through said grating, whereby the dew point of the kiln waste gases is raised for improved dust precipitation in said device.

8. The method of improving electric precipitation of dust from waste gases of a rotary cement kiln having an air-traversed cooler grating for clinker issuing from the kiln, which comprises spraying water upon only the layers of clinker located on a first portion of the cooler grating nearest the clinker entrance side of the grating, passing a supply of air through said cooler grating and through the layers of clinker on said grating, exhausting directly into the ambient atmosphere the portion of the air which traverses the layer of clinker located on a second portion of the cooler grating farthest from the clinker entrance side of the grating, and introducing into the kiln the residual steam-laden and heated air which passes through said grating so as to raise the dew point of the kiln waste gases, whereby the amount of subsequent electric precipitation of dust is increased.

9. Method according to claim 8, including the step of adjusting the air supply to the cooler grating to the quantity required to maintain the temperature of said steam-laden and heated air introduced into the kiln at substantially the same value as the latter air would assume when free of introduced water.

10. Apparatus according to claim 7, said preheater comprising a plurality of serially arranged cyclone means.

11. Apparatus for improving electric precipitation of dust from kiln waste gases, comprising a rotary cement kiln having a material inlet end and a material outlet end, an air-traversed cooler grating for receiving clinker material issuing from the kiln, means for supplying fresh cooling air from below said grating so as to pass air through the clinker material located on a predetermined portion of the cooler grating relative to the travel direction of the material, means for spraying water onto said predetermined portion of the cooler grating above the material thereon, conduit means between said grating and said kiln outlet end for passing to said kiln at least a major portion of the resulting moistened and heated air traversing a preceding portion of said grating prior to said predetermined portion, and means for controlling the volume of said fresh cooling air traversing said grating.

References Cited in the file of this patent

UNITED STATES PATENTS

| | | |
|---|---|---|
| 714,843 | Wentz | Dec. 2, 1902 |
| 1,596,509 | Pike | Aug. 17, 1926 |
| 1,844,782 | Mittag | Feb. 9, 1932 |
| 2,774,587 | Mayenchein et al. | Dec. 18, 1956 |
| 2,911,061 | Petersen | Nov. 3, 1959 |

FOREIGN PATENTS

| | | |
|---|---|---|
| 742,559 | Great Britain | Dec. 30, 1955 |